Sept. 9, 1958

A. W. FISCHER 2,851,326

OSCILLOGRAPH APPARATUS

Filed Nov. 3, 1955

INVENTOR.
ALBERT W. FISCHER
BY
Christie, Parker & Hale
ATTORNEYS

Sept. 9, 1958 A. W. FISCHER 2,851,326
OSCILLOGRAPH APPARATUS
Filed Nov. 3, 1955 2 Sheets-Sheet 2

INVENTOR.
ALBERT W. FISCHER
BY
Christie, Parker & Hale
ATTORNEYS

United States Patent Office 2,851,326
Patented Sept. 9, 1958

2,851,326

OSCILLOGRAPH APPARATUS

Albert W. Fischer, Pasadena, Calif., assignor, by mesne assignments, to Consolidated Electrodynamics Corporation, Pasadena, Calif., a corporation of California Application November 3, 1955, Serial No. 544,737

6 Claims. (Cl. 346—74)

This invention relates to improvements in string galvanometers, and more particularly to string galvanometers for recording an oscillographic trace directly upon a recording medium such as current-sensitive paper.

Direct writing oscillographs usually require a recording element which is capable of large amplitudes of motion throughout a specified frequency range in order to provide satisfactory oscillograph record.

Ordinarily, D'Arsonval type motors are provided with an elongated arm to magnify the motion so as to obtain sufficiently large amplitudes for a direct writing oscillograph. The elongated arm is provided with an inking pen or some other suitable marking stylus for making a record on a recording medium. In such an arrangement, the mass which is moved is large and the dynamics of the system make it impractical to record signals having a frequency above 100 cycles per second. Also, the movable arm arrangement provides a curvilinear oscillographic trace which is more difficult to interpret than a conventional rectilinear trace.

Signals having frequencies above 100 cycles per second usually are recorded by means of a photographic type instrument in which the necessary magnification of motion is obtained by optical means. Such arrangements require processing of the medium upon which the oscillographic trace is recorded and hence are not suitable for use when it is necessary to inspect the trace immediately after it is recorded.

These difficulties are overcome in the present invention by employing a large-amplitude string galvanometer as the writing element. The string is a flexible conductor, and it is supported at its two ends so that the central portion of the string can be deflected transversely a large distance in either direction in order to provide the large amplitudes of motion which are required for recording directly.

Such a galvanometer is capable of directly recording large amplitude traces over a wide frequency range. By way of example, it is capable of recording a one inch peak-to-peak amplitude trace at frequencies up to 250 cycles per second, or at even higher frequencies.

The conductive string element is located in a magnetic field with the string extending perpendicularly with respect to the direction of the magnetic field, so that the string moves transversely with respect to the magnetic flux in accordance with the magnitude of the electric current which flows through it.

Preferably, the string is supported at each end by springs so that as the string is deflected in either direction, the springs permit the ends of the string to move closer together. However, the spring supporting system does not maintain the tension on the string exactly constant, and the tension on the string increases in accordance with the amount of deflection of the string. The deflection of the string is directly proportional to the current which flows through it and inversely proportional to the tension on it. Hence, variations in the tension affect the linearity of the galvanometer.

Preferably, the pole pieces which provide the magnetic field are provided with recessed or cut out areas arranged so that the length of the conductive string upon which the magnetic field operates increases as the central portion of the string is deflected in either direction, so as to compensate for variations in the tension in the string and provide a substantially linear current-deflection response. This feature of the galvanometer is covered in application Serial Number 461,086, filed on October 8, 1954 by Clifford E. Berry.

The spring supports for the string are leaf springs which provide resilient support along the direction of the string and which restrain movement of the ends of the string in all other directions. This feature of the invention is covered in an application Serial Number 461,088, filed October 8, 1954, by Lewis B. Browder.

I prefer to employ a current-sensitive paper as the recording medium. However, other media such as pressure-sensitive or heat-sensitive paper may be employed.

For direct writing on current-sensitive paper, an anvil in the form of a conductive electrode having an edge located at the central portion of the string element is employed to guide the recording paper adjacent the writing element. The edge of the anvil is disposed perpendicularly with respect to the string element, and the current-sensitive paper is moved over the edge of the anvil so that it passes between the anvil and the string element of the galvanometer. A source of current is coupled between the anvil and the string so that an electric current passes through the paper at the intersection of the string and the line formed where the recording paper passes over the edge of the anvil. Thus, a trace is formed which provides an indication of the deflections of the string element of the galvanometer. This feature of the invention is also covered in the above mentioned application filed by Browder.

In Browder's application, the necessary pressure of the string element against the paper and the anvil to obtain acceptable recording is produced by deflecting the string from a straight line by use of the edge of the anvil. This arrangement produces the necessary pressure, hereinafter referred to as a "writing pressure," but results in decreased galvanometer sensitivity due to the resulting tension in the string. In addition, the string has a short life due to wear where the string passes over the edge of the anvil. If the tension in the string is reduced to increase the galvanometer sensitivity, the writing pressure is also reduced and the quality of the recording is impaired.

This invention provides means for increasing the useful life of the galvanometer string, and for maintaining the necessary writing pressure without undue tension in the string.

Briefly, the invention contemplates a direct recording galvanometer comprising a pair of spaced pole pieces for producing a magnetic field. An elongated conductor or string is located within the magnetic field, and an anvil is positioned adjacent the conductor. Means are provided for urging the conductor toward the anvil, and a bearing sleeve is carried by the portion of the conductor passing over the anvil to absorb any wear which might take place as the conductor is moved back and forth over the anvil.

In the presently preferred form of the invention, both the anvil and the bearing sleeve are made of a magnetic material so that the bearing sleeve is pulled toward the anvil by magnetic attraction. This provides the necessary writing pressure which can be controlled easily by proper selection of magnetic materials, or by adjusting the size of the anvil and bearing sleeve. This arrangement also avoids the necessity of deflecting the string from a straight line and permits the air gap between the spaced pole pieces to be reduced, thus allowing a reduction in the size of the pole pieces.

The invention is explained in more detail with reference to the drawings, in which.

Figure 1:
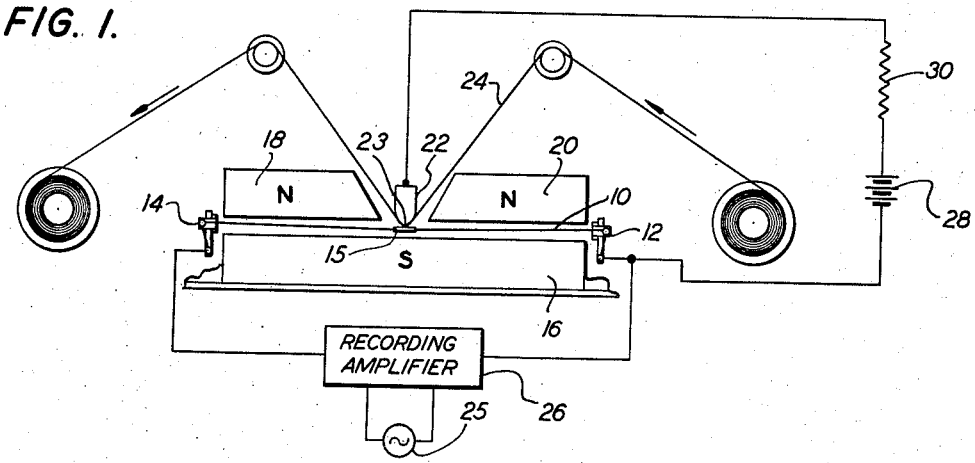
Fig. 1 is a schematic diagram of the recording apparatus.

With reference to Fig. 1, the string element of the galvanometer comprises a flexible conductor or string 10 which is supported at its ends by a pair of springs 12 and 14. A conductive bearing sleeve 15 of a suitable ferromagnetic material is disposed around and swaged or pinched to secure it to the center of the string. The springs are arranged to provide resilient support for the string element along the direction of the string, and they serve to restrain movement in all other directions, so that the deflection of the string is not adversely affected by the end supports.

The springs should have a low spring rate to insure constant incremental sensitivity with amplitude, their effective mass should be low so that it does not affect the string dynamics in a way which would require an undesirable increase in driving power, and its natural period should be high enough to insure that it follows the string excursions and that there is no tendency for periodic interchange of energy between the string and the springs.

A magnetic pole piece 16 and a pair of members 18 and 20 forming the other pole piece are located on opposite sides of the string element, and they provide a magnetic field which is disposed perpendicularly with respect to the length of the string element. The upper pole piece is in two parts so as to permit a recording medium to pass between them and adjacent the string element of the galvanometer.

A conductive guide or anvil 22 of a suitable ferromagnetic material is located in the space between the two upper pole pieces 18, 20 and spaced from each of the two pole pieces. The anvil has an edge 23 which extends perpendicularly with respect to the string element and which is equidistant from the ends of the sleeve. A current-sensitive recording paper 24 moves over the edge of the anvil so that it extends between the conductive anvil and the sleeve on the string element of the galvanometer in the plane of motion of the string. The two pole pieces 18, 20 induce magnetic poles of opposite polarity on the anvil, so that a magnetic field is established in the gaps between the anvil and the two pole pieces. The magnetic sleeve is attracted toward each of the gaps between the anvil and pole pieces 18, 20 with a resultant attraction toward the anvil in a direction perpendicular to the longitudinal axis of the sleeve.

The ends of the string element are connected to receive a signal from a source 25 through a recording amplifier 26. The electric current which flows through the string element causes its central portion to be deflected in accordance with the magnitude of the signals provided by the signal source. Co-pending application Serial Number 445,518, which was filed on July 26, 1954 by Norton W. Bell, discloses one suitable recording amplifier.

A source of electric current 28 has one terminal connected to the string element of the galvanometer and it has the other terminal connected through a current limiting resistor 30 to the conductive anvil. Thus, current flows through the current-sensitive recording paper at the intersection between the sleeve and the edge of the conductive anvil. Hence, the electric current which flows between the string element and the conductive anvil causes a trace to be recorded on the current-sensitive recording paper in accordance with the movements of the string element. The bearing sleeve takes any wear which may tend to occur as the string is deflected, and thereby greatly increases the useful life of the string without unduly increasing the effective mass of the string.

Figs. 2 to 6 show the details of one version of the recording apparatus which is capable of recording traces having one inch peak-to-peak amplitude up to a frequency of 250 cycles per second with good linearity.

Figure 5:
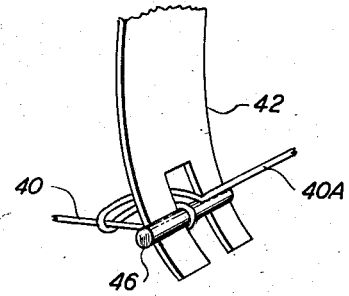
Fig. 5 shows how the string element of the galvanometer may be attached to the spring support.
Figure 6:
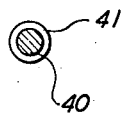
Fig. 6 is a view taken on line 6—6 of Fig. 3, showing the bearing sleeve in detail.

As before, the string element is a flexible conductor 40 which is supported by a pair of leaf springs 42 and 44. A conductive bearing sleeve 41 of a suitable ferromagnetic material is coaxially disposed around and soldered to the center of the string. The outer ends of the leaf springs are notched, and cylindrical-shaped pins 46 and 48 are affixed to the notched ends of the springs. The string element is looped around the respective pins in a loose fit, as illustrated in Fig. 5, and the ends of the string element extend approximately perpendicularly with respect to the direction of movement of the strings to form a pair of pigtails 40A and 40B which are connected to a pair of terminals 50 and 52 for coupling the string to a signal source. The terminals 50 and 52 and the springs 42 and 44 are mounted on a rigid base 53 which is affixed to a magnet yoke 54. The springs and the terminals are insulated from the rest of the structure.

With such an arrangement the pigtail end portions 40A and 40B are subjected primarily to torsional stresses only and hence have a long life. The pigtails provide a reliable electrical connection to the string, yet they exert negligible forces upon the string itself.

Figure 2:
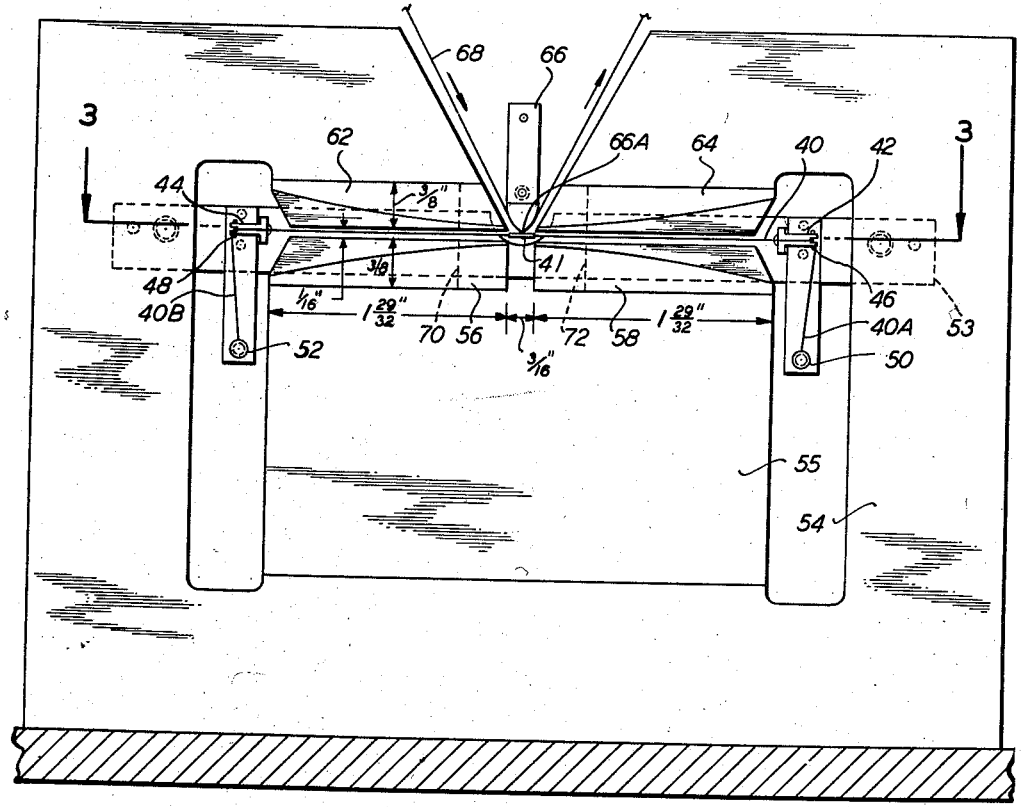
Fig. 2 is an elevation view of one embodiment of the invention.
Figure 3:
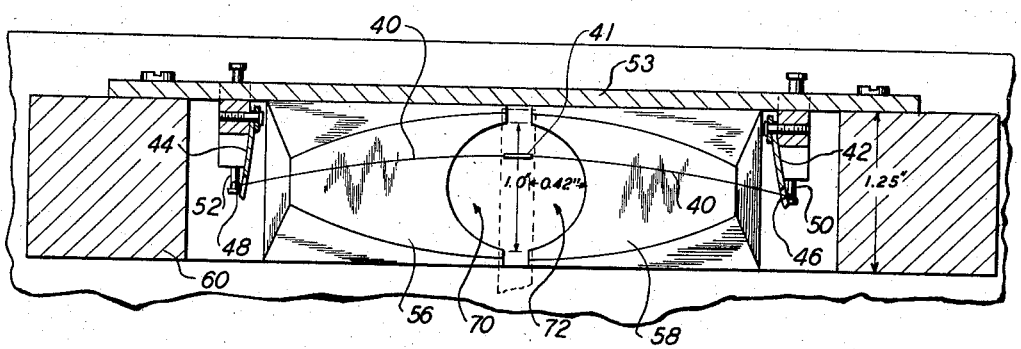
Fig. 3 is a sectional view along line 3—3 of Fig. 2.
Figure 4:
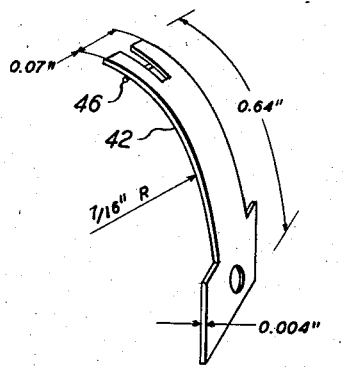
Fig. 4 is a perspective view of one of the spring supports.

Preferably, the leaf springs are mounted to extend along a direction which is perpendicular to both the direction of the magnetic field and the direction along which the string extends, as shown in Figs. 2 and 3. With such an arrangement, the leaf springs provide resilient support along the direction of the string and restrain movement of the ends of the string in all other directions. Also, flexure of the springs does not displace the string from its central location between the two pole pieces, and hence the pressure of the string on the recording paper does not change as the string is deflected transversely.

The magnetic field for the string element is provided by a magnet 55 having a lower pole piece which comprises a first pair of members 56 and 58, the yoke 54 interconnecting the first pole piece of the magnet to a lower pole piece comprising a second pair of members 62 and 64.

A conductive anvil 66 of a suitable ferromagnetic material is located between and spaced from the members 62 and 64 of the upper pole piece, and it is provided with an edge 66A which extends perpendicularly with respect to the length of the string element, and which is disposed adjacent the bearing sleeve. A suitable recording medium 68 is passed over the edge of the conductive anvil between the anvil and the string element of the galvanometer, so that the recording medium is located approximately in the plane of movement of the string. As with the apparatus of Fig. 1, the sleeve is pulled toward the anvil by magnetic attraction and bears against the recording medium and the anvil to provide the required writing pressure. The writing pressure is readily adjustable by changing any or all of several variables, e. g., the size of the anvil or sleeve, the material used for anvil or sleeve, and the strength of the magnetic poles. Thus, the writing pressure can be varied independently of the tension in the string. Conversely, the tension in the spring can be adjusted to any necessary value for desired sensitivity without affecting the writing pressure.

Fig. 3 illustrates the deflection of the string from its central location between the two pole pieces. The deflection of the center of the string element is directly proportional to the magnetic field strength and to the electric current which flows through the string element of the galvanometer, and it is inversely proportional to the tension in the string element. The spring support 42 and 44 are resilient along the direction along which the string extends, but the tension on the string increases when it is deflected from its central location. This increase in tension on the string element causes non-linearity in the current deflection response of the galvanometer. This may be corrected by providing recessed or cut out areas in the central portions of the pole pieces so that the length of the string upon which the magnetic field operates increases as the central portion of the string is deflected in either direction. One suitable arrangement is illustrated in Fig. 3 wherein the adjacent end of the two members forming one pole piece have cut out areas 70 and 72 of parabolic shape. With such arrangement the pole piece should have a cut out area which corresponds to that of the pole piece shown on Fig. 3.

The shape of the cut out areas 70 and 72 is defined to the first order by the formula $$K = K_0 - CY^2(0.55 - K_0)$$

where K times the length of the pole piece of the magnet equals the spacing between the edges of the opposed parabolas, $K_0$ is the value of K at the center of the pole piece where Y equals zero, C is the non-linearity coefficient which can be determined experimentally and Y is the lateral distance in either direction from the center of the pole piece. Setting the gap to be 0.188 inch when Y is 0.5 inch, and assuming that $C = 2.48$ (which was determined experimentally for the apparatus of Figs. 2 and 3), then $$K = .244 - .76Y^2$$

The non-linearity coefficient C is the coefficient in the expression $$T = T_0(1 + CY^2)$$

where T is the tension on the string, $T_0$ is the tension on the string when it is not deflected, and Y is the lateral displacement of the central portion of the string.

The coefficient C can be determined experimentally from current-deflection measurements conducted with magnet pole pieces which are not cut out to correct for the non-linearity, by ascertaining its value in the following equation $$I = Y(1 + CY^2)$$

The above equations do not take into account the fringing effects of the magnetic field in the cut out areas, and hence the cut out areas should be slightly larger than calculations indicate in order to obtain the best linearity.

Typical dimensions are shown on the apparatus of Figs. 2, 3, 4, and 6 for a recording arrangement wherein the magnetic field is 16,000 Gauss. The pole pieces are made of cold-rolled steel, the spring supports of beryllium copper (Berylco 25 Alloy), which is formed in the shape indicated in Fig. 4 and then age-hardened for two hours at 600° F., and the string element is composed of beryllium copper having a diameter of .0063 inch. The anvil is made of stainless steel type 416, and the bearing sleeve is a piece of stainless steel type 304 hyperdermic tubing .075" long with an i. d. .006" and an o. d. .012.

It will be apparent that the dimensions and the materials which are disclosed herein are merely illustrative and that various other arrangements may be employed if desired.

I claim:

1. A galvanometer comprising means for producing a magnetic field, an elongated conductor suspended at each end to permit transverse vibration intermediate its ends and being located within the magnetic field and adapted to receive a signal to be recorded, an anvil located adjacent the conductor and intermediate the ends of the conductor, means urging the conductor toward the anvil, and a bearing sleeve on the portion of the conductor nearest the anvil.

2. A galvanometer comprising a pair of spaced pole pieces for producing a magnetic field, an elongated conductor suspended at each end to permit transverse vibration intermediate its ends and being located within the magnetic field and adapted to receive a signal to be recorded, an anvil of magnetic material located adjacent the conductor and intermediate the ends of the conductor, and a bearing sleeve of magnetic material attached to the portion of the conductor nearest the anvil.

3. A galvanometer comprising a pair of spaced pole pieces for producing a magnetic field, one of the pole pieces comprising two members located end to end with a space between them, an elongated conductor suspended at each end to permit transverse vibration intermediate its ends and being located within the magnetic field and adapted to receive a signal to be recorded, an anvil of magnetic material located intermediate the ends of and adjacent the conductor in the space between the two members and spaced from at least one of the members to form a magnetic gap, and a bearing sleeve of magnetic material on the portion of the conductor nearest the anvil so that the sleeve is attracted toward the magnetic gap.

4. A galvanometer comprising a pair of spaced pole pieces for producing a magnetic field, an elongated conductor suspended at each end to permit transverse vibration intermediate its ends and being located within the magnetic field and adapted to receive a signal to be recorded, an anvil located adjacent the conductor and intermediate the ends of the conductor, means urging the conductor toward the anvil, and a bearing sleeve coaxially disposed about and bonded to the portion of the conductor nearest the anvil.

5. An oscillograph comprising means for producing a magnetic field, a flexible conductor, means supporting the flexible conductor in the magnetic field with the conductor extending transverse to the direction of the magnetic field, a conductive bearing sleeve attached to the intermediate portion of the conductor, a conductive anvil located adjacent and extending transverse to the flexible conductor and bearing sleeve, current-sensitive paper located between the anvil and the flexible conductor, means urging the sleeve toward the anvil so that the paper is contacted on one side by the anvil and on the other side by the sleeve, a source of electric current coupled between the anvil and the flexible conductor for causing electric current to pass through the current-sensitive paper, and means coupling the ends of the flexible conductor to a source of electric signals for causing the flexible conductor and sleeve to move across the current-sensitive paper in accordance with the magnitude of the electric current which passes through the flexible conductor.

6. An oscillograph comprising means for producing a magnetic field, a flexible conductor, means supporting the flexible conductor in the magnetic field with the conductor extending transverse to the direction of the magnetic field, a conductive sleeve of magnetic material attached to the intermediate portion of the conductor, a conductive anvil of magnetic material located adjacent and extending transverse to the flexible conductor and bearing sleeve, current-sensitive paper located between the anvil and the flexible conductor, means for producing a magnetic attraction between the anvil and the sleeve so that the paper is contacted on one side by the anvil and on the other side by the sleeve, a source of electric current coupled between the anvil and the flexible conductor for causing electric current to pass through the current-sensitive paper, and means coupling the ends of the flexible conductor to a source of electric signals for causing the flexible conductor and sleeve to move across the current-sensitive paper in accordance with the magnitude of the electric current which passes through the flexible conductor.

References Cited in the file of this patent

UNITED STATES PATENTS

| | | |
|---|---|---|
| 1,958,696 | Digby | May 15, 1934 |
| 2,309,994 | Skinner | Feb. 2, 1943 |
| 2,591,138 | Cooley | Apr. 1, 1952 |
| 2,647,033 | Faus | July 28, 1953 |